US012762903B1

(12) United States Patent
Herron

(10) Patent No.: US 12,762,903 B1
(45) Date of Patent: Oct. 13, 2026

(54) SYSTEM AND METHOD FOR AUTHENTICATING CALIBRATION OF VEHICLE ADAS SYSTEMS

(71) Applicant: Opus IVS, Inc., Dexter, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 83 days.

(21) Appl. No.: 18/496,463

(22) Filed: Oct. 27, 2023

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01); *G07C 2205/02* (2013.01)

(58) Field of Classification Search
CPC ... G07C 5/008; G07C 5/0808; G07C 2205/02
See application file for complete search history.

(56) References Cited

U.S. PATENT DOCUMENTS 11,538,188 B1 * 12/2022 Cejka .......................... G06T 7/80
2022/0018935 A1 * 1/2022 Jefferies ............. G01B 11/2755
2022/0268885 A1 * 8/2022 Vianello ................... G06T 7/73
2023/0243676 A1 * 8/2023 Lawrence ................. G06T 7/70 73/1.01
2024/0288544 A1 * 8/2024 Mambrilla ........... G01B 11/272
2024/0343262 A1 * 10/2024 Sturgeon ............... B60W 50/14

* cited by examiner

*Primary Examiner* — Jelani A Smith
(74) *Attorney, Agent, or Firm* — Gardner, Linn, Burkhart & Ondersma LLP

(57) ABSTRACT

A method of performing a vehicle ADAS calibration test with a vehicle diagnostic computer tool. The diagnostic tool is communicatively coupled to an electronic system of a vehicle. The vehicle is positioned relative to an ADAS target stand for testing a calibration of a vehicle sensor on the vehicle. The ADAS target stand is configured to support an ADAS target for use in testing the calibration of the vehicle sensor in a known position relative to a vehicle, such as according to manufacturer specifications. The method includes receiving with the diagnostic tool data from the electronic system of the vehicle, such as representative of a selected ADAS sensor of the vehicle. The diagnostic tool is used to confirm that the selected ADAS sensor of the vehicle is correctly calibrated as defined by the data and the specified location of the ADAS target. The calibration data comprises a location of the ADAS target as detected by the ADAS sensor.

19 Claims, 7 Drawing Sheets

SYSTEM AND METHOD FOR AUTHENTICATING CALIBRATION OF VEHICLE ADAS SYSTEMS

BACKGROUND OF THE INVENTION

The present invention is directed to a system and method for confirming that the Advanced Driver Assist Systems (ADAS) on a vehicle are properly calibrated, and in particular to testing the operation of the ADAS systems in a controlled environment to confirm that such systems were calibrated in accordance with calibration specifications and are operating per original equipment (OE) specifications.

In order for ADAS systems to operate properly they must be calibrated in accordance with manufacturer procedures and settings. In some instances, vehicle owners or repair shops will perform modifications to vehicles that may affect the vehicle ADAS systems, or a repair may be performed and a calibration of an ADAS system is needed to ensure that it is operating properly.

SUMMARY OF THE INVENTION

The present invention provides a vehicle calibration test system that confirms that the vehicle ADAS systems are correctly calibrated and operating properly in accordance with specifications. Diagnostic data from the vehicle electronic system is monitored during the procedure and captured to document the performance of the vehicle. For example, ADAS ECUS can be monitored with a diagnostic tool interconnected to the electronic system of the vehicle such that diagnostic data including data sets captured can be reviewed with respect to expected data results and the setup of any associated ADAS target stands (which include one or more ADAS targets) used in calibrating the vehicle ADAS systems. Review of the calibration data sets and the ADAS target stands can also be used to indicate whether a vehicle that has been modified from a traditional "stock" configuration (e.g., height raised or lowered from standard dimensions) was correctly calibrated according to calibration procedures and specifications.

Such ADAS calibration performance reviews can provide an authentication or validation of the ADAS calibration performed on the vehicle to confirm that the ADAS calibration was performed properly and in accordance with specified parameters. Calibration authentication documentation can also be used to confirm that if the calibrated vehicle was modified, that the effected vehicle sensors and ADAS sensors were properly calibrated with ADAS targets placed in specified stock positions.

In an aspect of the exemplary embodiment, the diagnostic tool is configured to attach documentation data files to any calibration authentication report for the purposes of confirming and validating what services were performed, how they were performed, and the results thereof. Such documentation may be generated while the service is carried out (e.g., diagnostic data sets are captured and evaluated during the ADAS calibration procedure) whereby each progressive step of the calibration procedure may be documented. In an aspect of the present invention, the vehicle service system further includes the extraction of diagnostic data from the diagnostic tool to document vehicle and test equipment setup before and during calibration procedures. In a further aspect of the present invention, the documentation of vehicle and ADAS target stand setup for calibration procedures includes imagery that provide photo distance measurements. In an alternative embodiment, the documentation of calibration procedures includes position and orientation information received from the ADAS target stand configured to calibration ADAS sensors (e.g., position and orient the sensors). The ADAS target stand can also include an ability to identify and/or read a target identity (e.g., part number). Such information can be provided to the diagnostic tool via a communications link between the diagnostic tool and the ADAS target stand.

In accordance with an aspect of the present invention, a method of performing a vehicle ADAS calibration test with a vehicle diagnostic computer tool includes communicatively coupling the diagnostic tool to an electronic system of a vehicle. The vehicle is positioned relative to an ADAS target stand for testing a calibration of a vehicle sensor on the vehicle. The ADAS target stand is configured to support an ADAS target for use in testing the calibration of the vehicle sensor. The ADAS target is positioned according to manufacturer specifications. The method includes receiving with the diagnostic tool calibration data from a selected ADAS sensor of the vehicle. The diagnostic tool is used to confirm that the selected ADAS sensor of the vehicle is correctly calibrated as defined by the calibration data and the specified location of the ADAS target. The calibration data comprises a location of the ADAS target as detected by the ADAS sensor.

In accordance with another aspect of the present invention, a vehicle service system for performing a vehicle advanced driver assist system (ADAS) calibration test operation with a vehicle diagnostic computer tool includes an ADAS target system and a vehicle diagnostic computer tool. The ADAS target system includes an ADAS target stand and an ADAS target positioned relative to a vehicle for calibrating a vehicle sensor on the vehicle. The ADAS target is configured for use in calibrating the vehicle sensor. The ADAS target stand is configured to position the ADAS target according to manufacturer specifications. The vehicle diagnostic computer tool is communicatively coupled to an electronic system of the vehicle. The vehicle diagnostic computer tool is configured to receive calibration data from a selected ADAS sensor of the vehicle. The vehicle diagnostic computer tool is configured to confirm that the selected ADAS sensor of the vehicle is correctly calibrated as defined by the calibration data and a position of the ADAS target. The calibration data comprises a determined location of the ADAS target as detected by the ADAS sensor.

In an aspect of the present invention, the calibration data includes a real-time data stream or data set produced by the selected ADAS sensor. The real-time data stream or data set includes data associated with the determined location of the detected ADAS target.

In a further aspect of the present invention, the manufacturer specifications for placement of the ADAS target is a stock or factory placement.

In another aspect of the present invention, the vehicle diagnostic computer tool is configured to obtain vehicle data from the electronic system of the vehicle. The vehicle diagnostic computer tool is configured to receive ADAS target data from the ADAS target stand. The vehicle diagnostic computer tool is configured to receive manufacturer specifications and parameters for calibrating the selected ADAS sensor, and to confirm that the vehicle and the ADAS target stand are ready for the calibration test as defined by the vehicle data, the ADAS target data, and the manufacturer specifications and parameters for calibrating the selected ADAS sensor.

The vehicle data comprises at least one of VIN, year, make, and model of vehicle. The ADAS calibration test is defined by the vehicle data and the manufacturer specifications and parameters for calibrating the selected ADAS sensor.

In an aspect of the present embodiment, the vehicle data comprises a list of the ADAS sensors on the vehicle. The ADAS calibration data received from the selected ADAS sensor is defined by the list of ADAS sensors on the vehicle.

In another aspect of the present embodiment, the vehicle data comprises at least one of a tire pressure sensor signal, a fuel level sensor signal, a steering angle sensor signal, and active suspension sensor data. The vehicle diagnostic computer tool is configured to confirm that the vehicle and ADAS target stand are configured for undergoing an ADAS calibration test by confirming that tire pressure sensor signals, fuel level sensor signals, and/or steering wheel angle sensor signals are within predetermined limits for the calibration test of the ADAS sensor.

In a further aspect of the present embodiment, the vehicle data comprises diagnostic data comprising diagnostic scan data received by the vehicle diagnostic computer tool. The vehicle diagnostic computer tool is configured to review the diagnostic scan data for any diagnostic trouble codes (DTCs) from any of the ADAS sensors of the vehicle. The vehicle diagnostic computer tool is configured to confirm that the vehicle and ADAS target stand are configured for undergoing an ADAS calibration test by confirming that there are no ADAS related DTCs that would prevent the calibration test of the ADAS sensor.

In yet another aspect of the present embodiment, the ADAS target data comprises a current position of the ADAS target stand relative to the vehicle. The current position comprises a distance between the ADAS target stand and the vehicle and an alignment angle between the ADAS target stand and the vehicle. The ADAS target data comprises a particular ADAS target installed on the ADAS target stand. The ADAS target data comprises an orientation and placement of the ADAS target with respect to the ADAS target stand.

In an aspect of the present embodiment, the vehicle diagnostic computer tool is configured to confirm that the vehicle and ADAS target stand are configured for undergoing an ADAS calibration test by comparing the vehicle data with the ADAS target data to confirm that the ADAS target installed on the ADAS target stand is correct for the ADAS sensor to be tested as defined by the manufacturer specifications and parameters for calibrating the selected ADAS sensor.

The vehicle diagnostic computer tool is configured to confirm that the alignment angle and distance between the vehicle and the ADAS target stand is correct for the ADAS sensor to be tested as defined by the manufacturer specifications and parameters for calibrating the selected ADAS sensor, and to confirm that an ADAS target installed on the ADAS target stand is correctly aligned relative to the vehicle for the calibration test of the ADAS sensor as defined by the manufacturer specifications and parameters for calibrating the selected ADAS sensor.

These and other objects, advantages, purposes, and features of this invention will become apparent upon review of the following specification in conjunction with the drawings.

DESCRIPTION OF THE PREFERRED EMBODIMENTS

Figure 1:
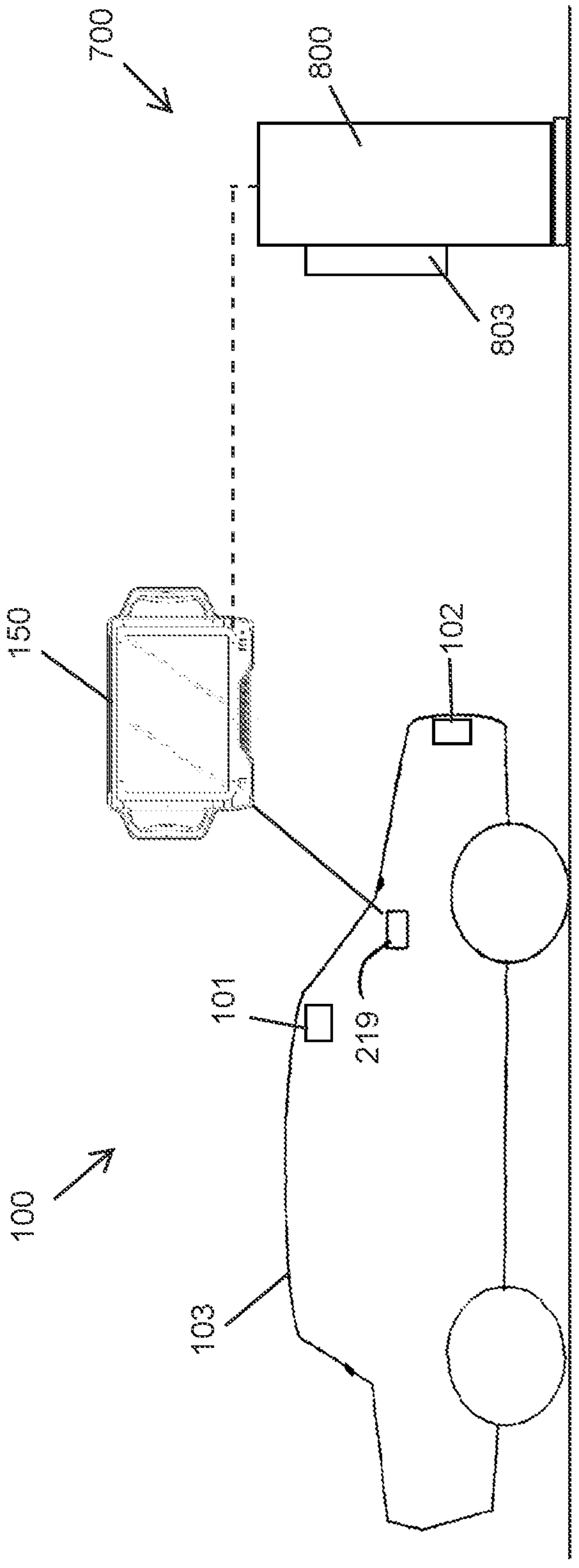
FIG. 1 is a side elevation view of an exemplary vehicle calibration test system in accordance with the present invention.

The present invention will now be described with reference to the accompanying figures, wherein the numbered elements in the following written description correspond to like-numbered elements in the figures.

Referring to the drawings, an exemplary vehicle calibration test system 100 and methods for monitoring and capturing vehicle calibration data is disclosed for determining or evaluating whether one or more ADAS systems and sensors of the vehicle 103 are properly calibrated, such as a forward facing camera 101, radar or LiDar sensor 102, or other such ADAS sensors. The system 100 and methods can include using a diagnostic computer tool 150 to obtain diagnostic data from the electronic system 219 of vehicle 103 and target information from an associated ADAS target system 700 that includes an ADAS target stand 800 and one or more ADAS targets 803 that are used for authenticating and/or confirming the calibration of ADAS systems of vehicle 103, including various ADAS sensors of the vehicle. Such vehicle sensors can include ADAS sensors, such as laser sensors, camera image and/or video sensors, lidar sensors, radar sensors, ultrasonic sensors, and the like. Such sensors are initially installed on the vehicle and calibrated for operation by the original equipment manufacturer (OEM) of the vehicle 103. Subsequently, the sensors may require calibration upon repairs to the vehicle affecting the sensors, such as collision damage and the like, in which case the sensors must be calibrated according to manufacturer specifications. In accordance with aspects of system 100, vehicle 103 is positioned into a known orientation relative to target stand 800 and one or more targets 803 and diagnostic computer tool 150 is connected to the electronic system 219 of vehicle 103 by an OBD interface 220. While in the known orientation, one or more vehicle sensors should be in position to detect targets 803 and diagnostic tool 150 is used to read diagnostic data 706 from electronic system 219 related to those vehicle sensors. The obtained diagnostic data 706 is then compared to predetermined results that would correspond to a properly calibrated sensor. If the diagnostic data ##is within particular limits or range with respect thereto the vehicle sensor is determined to be properly calibrated according to specifications. If, however, the obtained diagnostic data 706 is not within the particular limits or range than the vehicle sensor is determined to not be properly calibrated. In accordance with a configuration of the present invention, the ADAS target stand 800 and targets 803 are put into a position corresponding with OEM specifications for calibrating the sensor or sensors being tested, with the diagnostic data 706 representing a vehicle determined range or distance of the target 803 that the vehicle, via the ADAS ECU, determines the target 803 to be located, with the vehicle determined range being compared to the actual known range or distance of the target 803 relative to the vehicle that is established by the setup of stand 800 and target 803.

Assuming that the vehicle sensors are properly aligned, when a target is positioned with respect to the vehicle sensor according to specified parameters, the resultant calibration data (e.g., diagnostic data including a real-time data stream from the sensor under test) will identify the target in its specified position. If the target is detected by the vehicle sensor in a particular location that is within a prescribed range of values for the specified target position, then the vehicle sensor is considered to be properly calibrated i.e., the vehicle sensor's calibration is considered to be "authenticated" or "validated." The diagnostic tool 150 is used to monitor the particular real-time data stream from the vehicle sensor. In an aspect of the present embodiment, a calibration test program can access a vehicle sensor's real-time data stream, and may also access diagnostic data from the vehicle to determine the vehicle's make, model, and year as well as a listing of the ADAS sensors in the vehicle. From this vehicle information, the associated manufacturer and/or aftermarket documentation related to calibration procedures and specifications for one or more selected sensors can be accessed and used by the calibration test program to validate and/or authenticate an existing calibration of the one or more selected sensors.

Figure 2:
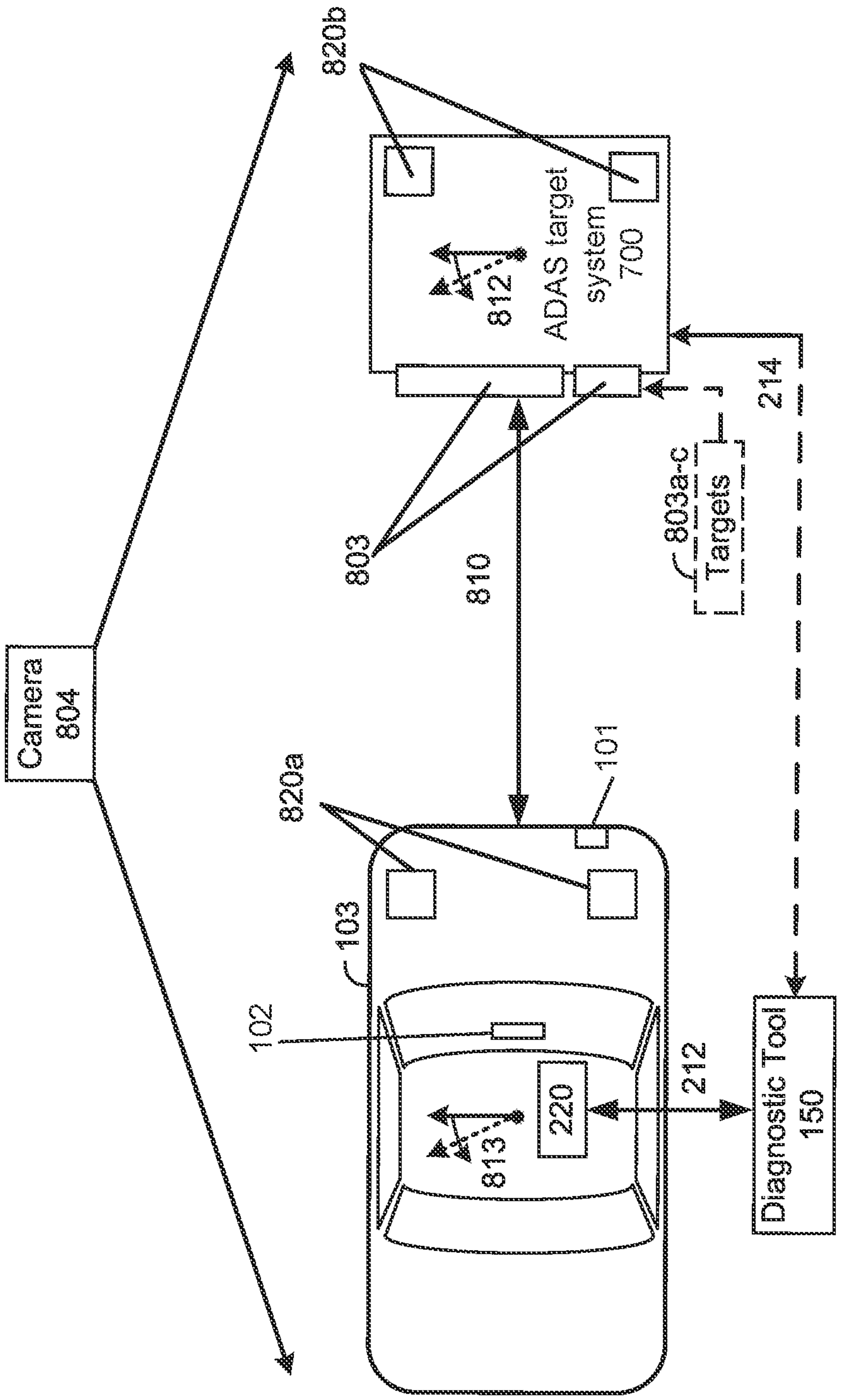
FIG. 2 is a top plan view of the vehicle calibration test system of FIG. 1.
Figure 3:
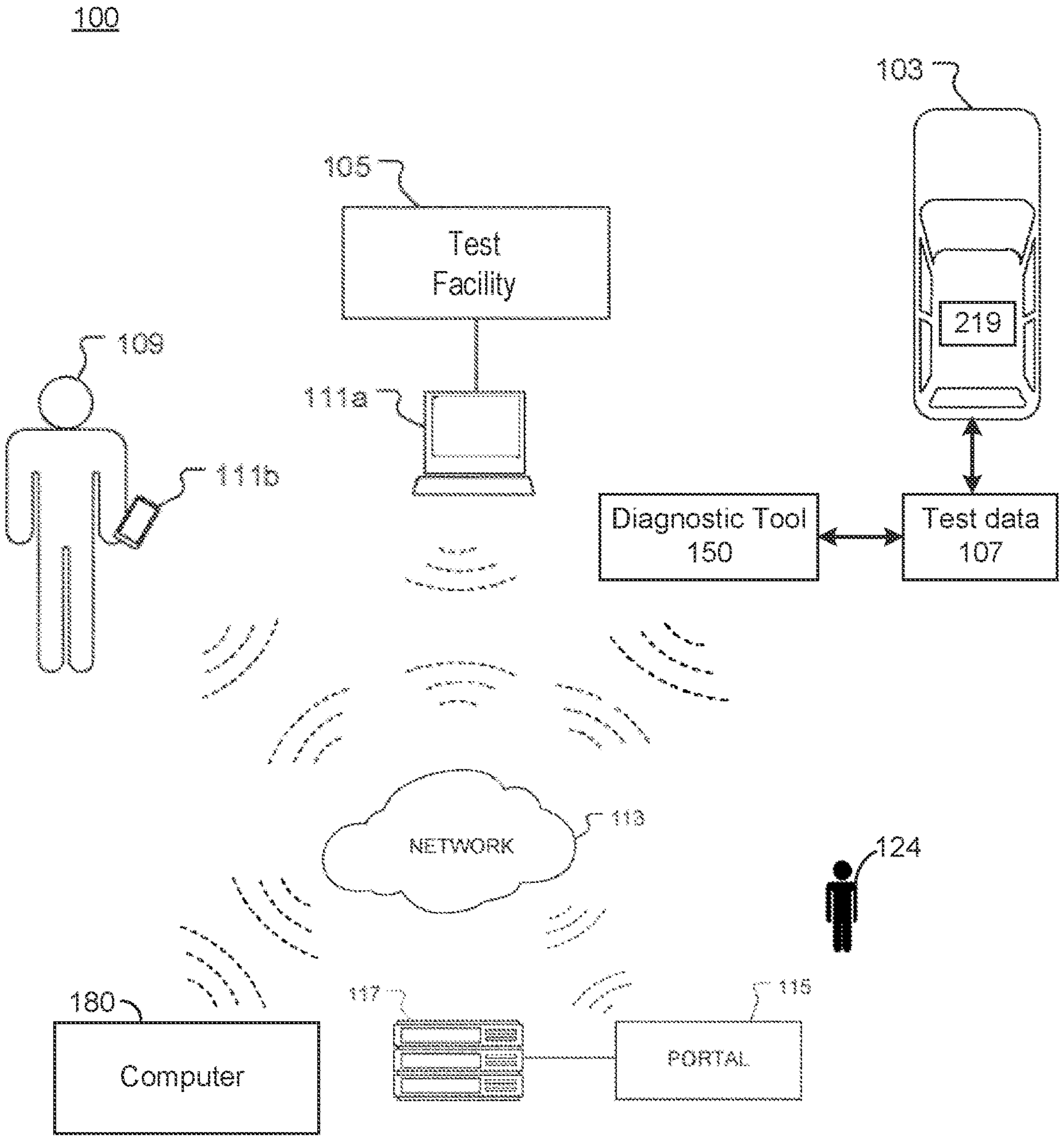
FIG. 3 is a diagram of computer systems for obtaining and exchanging data associated with a vehicle calibration test facility.
Figure 4:
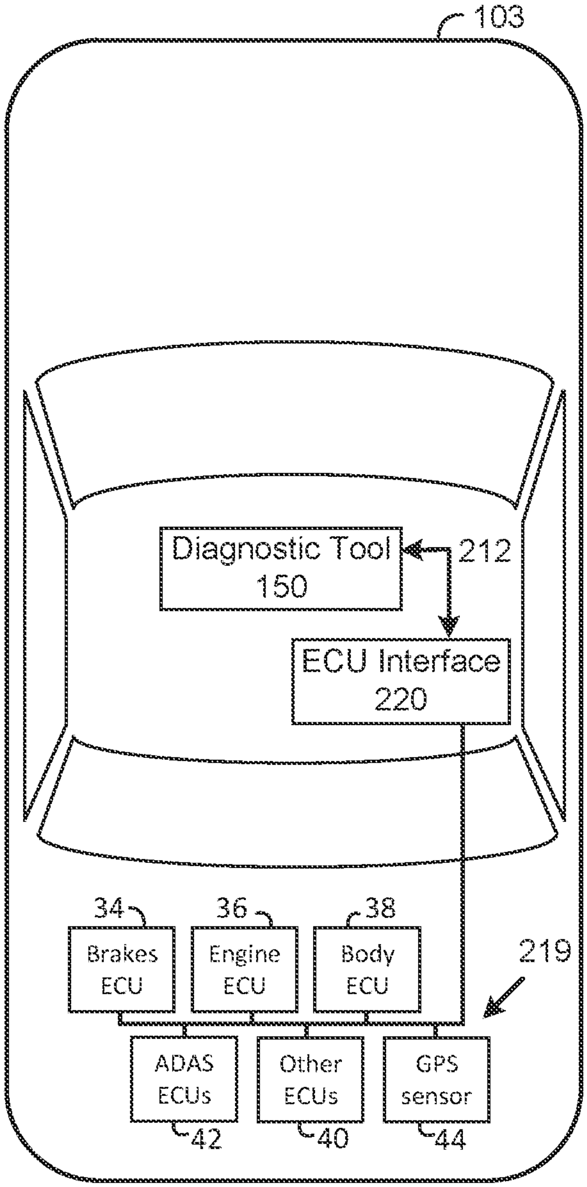
FIG. 4 is a diagram of a diagnostic tool of a vehicle service system coupled to a vehicle receiving service in accordance with the present invention.

FIGS. 1 to 3 illustrate a vehicle calibration test system 100 in accordance with one embodiment of the present application. A vehicle 103 is brought to a testing facility 105, which may be a repair facility or a facility associated with a governmental entity for confirming that vehicles are properly operating, such as according to manufacturer or governmental requirements. The test facility 105 includes a computing device 111*a* that is operable to be in selective communication with a remote computing device or portal 115 via a network 113. The portal 115 is further in communication with a database 117. In an exemplary embodiment, the database 117 may receive testing results from computing device 111*a* and/or may provide information for conducting ADA calibration tests on vehicle 103, such as identifications of the ADAS systems on vehicle 103, the test configuration of vehicle 103 and stand 800 and targets 803 to use for testing the ADAS systems of vehicle 103, and the like. Alternatively, the computing device 111*a* and/or the diagnostic tool 150 may include the information needed for performing a calibration test, such as by way of having its own such database.

As illustrated in FIG. 1, the vehicle service system 100 includes a vehicle diagnostic computer tool ("diagnostic tool") 150 that is operatively connectable to the electronic system 219 of the vehicle 103 (via an interface 220), where the diagnostic tool 150 may be used to provide information to a user regarding a calibration test service to be performed, provide the individual procedural steps to the calibration test service to be performed, confirm proper completion of each of the procedural steps, and to record test data during the calibration test carried out on the vehicle 103. Such test data includes information captured from the vehicle's electronic system 219 (via the interface 220). For example, as part of the setup, performance of a calibration or calibration authentication, and calibration data evaluation, calibration specification parameters 708, test data 107, vehicle information 704, and data streams 706 from a selected vehicle sensor are received and evaluated by an authentication analysis application 710 to generate an authentication decision 712 (i.e., whether the vehicle sensor is properly calibrated). The authentication decision 712 can be automatically transmitted by the diagnostic tool 150 to the computing device 111*a* and/or remote computer 180 and attached to an electronic invoice file.

As discussed herein, the diagnostic tool 150 is communicatively coupled to the electronic system 219 via an interface 220 of the vehicle 103. While the calibration test service is being performed, data 107 from the electronic system 219 is obtained by the vehicle diagnostic computer tool 150, which data 107 may be transmitted to the portal 115 and/or computing device 111*a* and/or retained in the computer tool 150, with the data 107 being associated with vehicle 103 from which it was taken. For example, in one embodiment, the diagnostic tool 150 is coupled to the vehicle ECUs via an ECU Interface 220, such as, an on-board diagnostic (OBD) diagnostic port of the vehicle 103 in order to receive test data from the various ECUs, such as an engine ECU 36, a body ECU 38, brake ECUs 34, Adaptive Driver Assistance Systems (ADAS) ECUs 42, GPS sensors 44, and other ECUs 40, and including other electronic parts and components of the vehicle 103. The diagnostic tool 150 is shown connected to the ECU interface 220 via a communications link 212. The communications link may be a vehicle cable for a wired connection or a wireless communications link for a wireless connection.

By monitoring the electronic system 219 of the vehicle 103 (and its electronic control units (ECUs)), the vehicle service system 100 provides for the monitoring and recording of test data 107 from the vehicle during the calibration test service. The recorded test data 107 may then be transmitted to a computing device 111*a* of the service provider 105 and/or to a remote computing device or portal 115 and/or retained in diagnostic tool 150, for confirmation, reporting and the like The vehicle service system 100 provides for the selective retrieval and capture of procedural documents which are used during the calibration test service. The procedural documents include, for example, procedural instructions, such as, original equipment manufacturer (OEM) alignment and/or calibration procedures and instructions, and OEM diagnostic scan documents and procedures. As discussed herein, the procedural documents may be selectively retrieved by the diagnostic tool 150 or the computing device 111*a* based upon vehicle information (e.g., vehicle make, model, year, and VIN). The procedural documents may be retrieved from a local memory, from the portal 115 (e.g., database 117), retained in memory of computing device 111*a* or diagnostic tool 150 or some other remote source. The selected procedural documents associated with the calibration test service of the vehicle 103 may be stored (e.g., in the memory 307 or storage 309 of the diagnostic tool 150 or stored in the database 117 by accessing the portal 115).

The diagnostic tool 150 may include an operator interface in the form of a display screen or touchscreen 317 to provide instructions and receive inputs from the user or observer. The diagnostic tool 150 can provide instructions and/or feedback to the user, such as instructions on how to setup the calibration test for the particular make, model and vehicle 103 being tested, including for the particular ADAS sensor being calibration tested. The instructions may be provided from the database 117, or another computer, or may be retained in memory of diagnostic tool 150.

The vehicle service system 100 enables an individual 109, such as a mechanic, vehicle owner, insurance representative, or the like, to be in communication with the computing device 111*a* and/or portal 115 via the network 113 via another computing device 111*b*, such as a tablet, mobile phone, laptop or other type of computer.

The vehicle diagnostic computer tool 150 may be constructed in accordance with diagnostic computer tools disclosed in U.S. Pat. Nos. 11,373,465, 11,257,307 and/or 11,423,715, which are hereby incorporated herein by reference in their entireties.

Accordingly, it should be appreciated that diagnostic tool 150 is connectable to the electronic system 219 of the vehicle 103, such as via an OBD II port of the vehicle 103, to be in communication with the ECUs of the vehicle and obtain data therefrom.

The computing devices 111*a*, 111*b*, and the diagnostic tool 150 include components that allow for the device or tool to operate and perform calculations to enable the system. The components may include, for example, a CPU that directs other components such as a transmitter, memory, storage, input/output devices and a power source, including for running the software of system 100. It will be understood that these components function in harmony to create the environment wherein the vehicle service system 100 functions. The input/output devices can include keyboards and display screens for data entry and test result monitoring. Optionally, the components (of the diagnostic tool 150 and the computing devices 111*a*, 111*b*) can include a video and/or image camera for recording and imaging the procedural steps of any required and/or requested calibration test service. The video camera can also be configured to capture images during the service, such as to capture images of the vehicle (e.g., images depicting vehicle damage), any test or service setup, and of any printed documents generated by the procedural steps of the service which need to be documented and saved along with the data 107.

An exemplary vehicle 103 at test facility 105 may require a validation or authentication of the calibration of one or more vehicle sensors (e.g., ADAS sensors). Such a calibration test used to authenticate or validate the sensor's calibration may use the same or similar vehicle setup specifications and test equipment setup as if a sensor calibration was to be performed. In an aspect of the present embodiment, the calibration test could result in the generation of a new service request for a sensor calibration based upon the calibration test. The vehicle 103 may require a calibration test to be performed as part of a routine annual vehicle inspection, as part of a vehicle evaluation (e.g., in connection with a vehicle inspection for a future sale), because a diagnostic scan revealed one or more diagnostic trouble codes (DTCs) associated with vehicle sensors and/or ADAS sensors, or due to collision damage the vehicle 103 suffered (or might have suffered) in a crash or accident that caused (or could have caused) damage to the vehicle 103 and it's sensors and ADAS sensors. An evaluation of a sensor's calibration could also be needed after a repair (either on the sensor or a portion of the vehicle that could affect the sensor's alignment in the vehicle).

Depending on the OEM specifications and requirements, the repair or calibration service may also be considered a required or mandated repair or calibration service to meet OEM specifications and requirements.

In an aspect of the present embodiment, a calibration test for a calibration authentication or validation may be requested at a vehicle inspection station (e.g., a local governmental vehicle inspection station) when the calibration of one or more of the sensors of a vehicle are called into question, or as part of routine vehicle registration renewal. As discussed herein, while the vehicle 103 might need to have its vehicle sensors and/or ADAS sensors tested for calibration authentication/validation because a diagnostic scan revealed one or more diagnostic trouble codes associated with one or more vehicle sensors and/or ADAS sensors, the vehicle 103 might also need to have its vehicle sensors and/or ADAS sensors evaluated when there is cause to question the accuracy or validity of a previous calibration procedure. For example, if a vehicle has been modified, such as having been lifted or lowered from its OEM manufacturing "stock" configuration, including due to suspension lifts or lowering coils or the like, then under certain circumstances such a vehicle may be directed to undergo a calibration test, such as by a governmental agency or associated entity.

As described herein, a calibration authentication procedure comprises a comparison of calibration data from a selected sensor (e.g., an ADAS sensor) that is being tested for calibration with respect to an ADAS target system 700 that includes an ADAS target stand 800 with one or more targets 803 that are arranged with respect to the vehicle 103. The ADAS target stand 800 is configured to hold one or more ADAS targets 803*a*, 803*b*, 803*c* that can be, for example, optical pattern targets for viewing by cameras, or can be physical targets, such as reflectors, trihedral targets, and the like for use with RADAR and LiDAR sensor systems, or other such targets for other ADAS sensors. An ADAS target 803 can also be placed on a floor about the vehicle 103, such as a mat comprising an optical target such as for use with cameras on the vehicle. Note that either the vehicle 103 or the ADAS target system 700 can be positioned with respect to each other. The ADAS target system 700 is configured for use in aligning ADAS targets 803 with the vehicle 103 and ADAS vehicle sensors for calibration of the vehicle sensors. The ADAS target system 700 may be a conventional device comprising a fixture and target holders for holding and positioning targets 803. The system 700 may include actuators, position encoders and the like for positioning the targets and providing position, location or orientation data regarding the target 803, including relative to the stand 800, with the stand 800 in turn providing position data relative to the vehicle 103 whereby the position of the target 803 relative to the vehicle 103 can be established.

In the illustrated embodiment orienting the the ADAS target stand 800, and any associated targets 803*a*, 803*b*, 803*c*, include positioning them according to the manufacturer's specifications for performance of an ADAS calibration procedure. That is, the targets 803 are positioned in an OEM specified configuration relative to vehicle 103, such as based on the make, model and year of the vehicle and the given sensor the calibration of which is being tested such that the sensor being tested is tested against a standard or stock configuration as provided by an OEM specification for the sensor under test. Thus, if a vehicle's sensors are evaluated and found to be within manufacturer's specified parameters, the sensor under test is determined to have an authentic or valid calibration. However, in alternative embodiments other known positions of the target stand 800 and/or targets 803 relative to vehicle 103 may be employed, including in accordance with aftermarket specifications.

To assess calibration data from a sensor (e.g., an ADAS sensor such as a forward facing camera 101, radar 102, or other sensor), the ADAS sensor's ECUs 42 are monitored with the diagnostic tool 150 that receives associated sensor data from the ADAS sensor via its ADAS ECU 42. The diagnostic vehicle data 706 that is obtained, identified via an associated parameter ID (PID), includes real-time data streams or data sets from the ADAS ECU 42 that includes sensor output that is captured from the electronic system 219 while the vehicle 103 is in the known position relative to the target 803 during the performance of a calibration test. That is, when a target 803 is placed before the vehicle sensor in a specified position and when the vehicle sensor detects the target 803, the resultant real-time data stream and/or data sets 706 from the electronic system 219 and corresponding vehicle sensor will indicate a vehicle detected location or position of the target 803. The vehicle detected or determined location of a test target 803 is compared to the actual, specified parameters for the calibration test (i.e., the sensor's determined target location with respect to the target's actual location). This may be, for example, comparing the output vehicle diagnostic vehicle data 706 to an expected range of where the target 803 should be determined to be by the electronic system 219, where the output data 706 may correlate, for example, to distance. If the vehicle 103 has been modified from a traditional stock configuration beyond what can be accommodated by the ADAS system of the vehicle, the vehicle detected or determined location of a target 803 will not correspond to the actual position of the target 803 as established during the setup procedure of positioning the vehicle 103 relative to the target 803 and stand 800. A finding that the vehicle detected or determined location of a target 803 corresponds to the actual position of the target 803 provides an indication that the vehicle sensor is properly calibrated. That is, a finding that the calibration is valid or within specifications is an indication that the vehicle sensor in the vehicle is aligned and/or calibrated with respect to stock positions of targets. In contrast, a finding that the vehicle determined location of target 803 does not match the actual location of the target 803 indicates that the ADAS sensor of the vehicle 103 may have been previously improperly calibrated by moving the targets to unconventional or off-spec positions during calibration in order to obtain a "successful" calibration. That is, such results may indicate that a calibration performed after the vehicle was modified was performed in such a manner to "fool" or "trick" the calibration procedures into believing that the sensors in question are properly calibrated. Such a situation would not be detectable merely by looking at diagnostic data alone, such as to check for fault codes or diagnostic trouble codes (DTCs). That is, a scan of the electronic system 219 would not register any such codes indicating that ADAS systems were not operating properly because when the prior calibration procedure was performed rather than placing targets into the OEM specified positions, the targets may have been intentionally miss-positioned in order to complete the calibration procedure. As a result, the ADAS ECU is effectively spoofed or tricked into operating as if it were properly calibrated when in reality it is not, whereby the ADAS sensors will not operate properly. For example, a spoofed forward facing camera may cause vehicle 103 to operate as if a vehicle it is following is a given distance in front of vehicle 103 when in reality it is s different distance. The diagnostic data 706 obtained during the vehicle calibration test procedure may be obtained from the vehicle 103 while electronic system 219 or ADAS ECUs 42 are operating in a calibration or diagnostic mode or in a normal operating mode.

When a calibration test is to be performed on a vehicle (e.g., vehicle 103) at a test facility 105, the vehicle 103 can be validated for the requested or required calibration procedure. As discussed herein, the diagnostic tool 150 is communicatively coupled to an ECU interface 220, such as an on-board diagnostic (OBD) diagnostic port of the vehicle 103. The OBD (i.e., interface portal 220) is configured to receive diagnostic data (e.g., test data 107) from the various ECUs of the vehicle 103 (via OBD parameter IDs (PIDs) for selecting particular data streams), such as engine ECUs 36, a body ECU 38, brake ECUs 34, Adaptive Driver Assistance Systems (ADAS) ECUs 42, and other ECUs 40, and including other electronic parts and components of the vehicle 103 (e.g., a GPS sensor 44). The diagnostic tool 150 is shown connected to the ECU interface 220 via a communications link 212. In one embodiment, the communications link 212 is a vehicle cable. In another embodiment, the communications link 212 is a wireless link.

For example, in preparing the vehicle 103 for calibration testing, the vehicle's make, model, year, VIN, and the like, can be documented as vehicle information 704 from test data (e.g., diagnostic data) 107. As described herein, such vehicle information 704 can be extracted from test data 107 acquired by a diagnostic scan of the vehicle 103 via a diagnostic tool 150 coupled to the electronic system 219 of the vehicle 103. As part of the service validation before the calibration procedure or test is performed, relevant OEM and/or aftermarket specifications and procedures 708 (calibration procedures, specifications, and parameters) are acquired from local and/or remote sources. The vehicle validation before any calibration service is performed also includes the evaluation of downloaded diagnostic data (e.g., test data 107) from the from the vehicle 103 to ensure that the vehicle 103 is "setup" and ready for the calibration service. Such vehicle setup data can include, for example, any of fuel level sensor signals, tire pressure sensor signals, and other sensor outputs related to the service to be performed. Such diagnostic data is monitored by associated vehicle ECUs and captured by the diagnostic tool 150. Such vehicle information 704 can be selected as specified in vehicle setup procedures for a particular vehicle repair and/or calibration procedure (e.g., OEM and/or aftermarket service instructions and specifications). The diagnostic data can also include the performance of a diagnostic scan to determine whether there are any DTCs for any of the vehicle sensors and/or ADAS sensors. Such setup procedures and associated documentation can be captured and used for service documentation and verification as disclosed in U.S. patent application Ser. No. 17/977,182, which is hereby incorporated herein by reference in its entirety.

Figure 7:
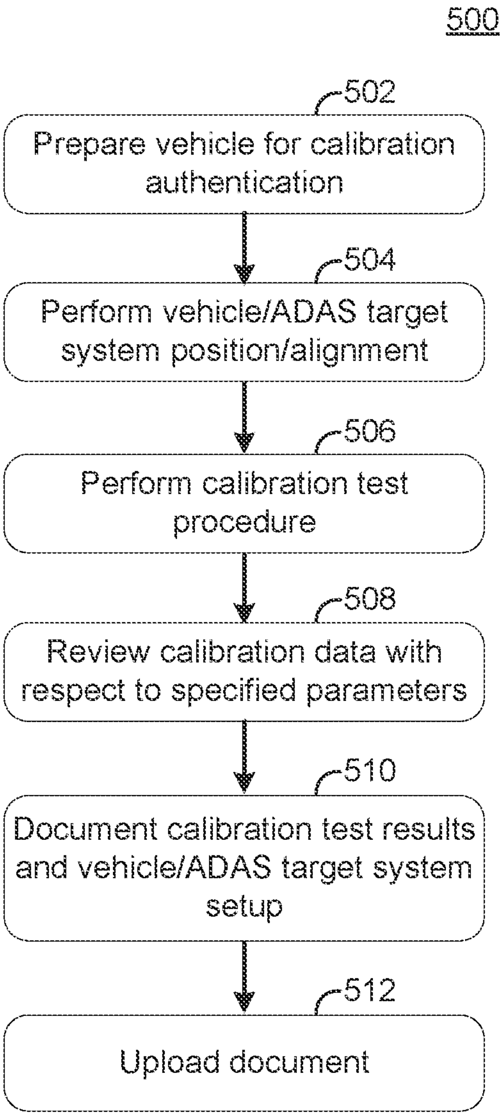
FIG. 7 is a flow diagram illustrating steps to a method for monitoring, evaluating, and documenting calibration data produced during a calibration procedure performed on a vehicle in accordance with the present invention.

With the vehicle 103 prepared for the calibration test procedure, the vehicle 103 and any necessary test equipment (e.g., an ADAS target stand 800 with one or more targets 803*a*, 803*b*, 803*c*) are arranged with respect to each other. The ADAS targets 803 can be, for example, optical pattern targets for viewing by cameras, or can be physical targets, such as reflectors, trihedral targets, and the like for use with RADAR and LiDAR sensor systems, or other such targets for other ADAS sensors. Note that either the vehicle 103 or the ADAS target stand 800 can be positioned with respect to each other. As illustrated in FIG. 7, as part of a method 500 for testing the calibration of an ADAS system of the vehicle 103, the vehicle 103 and an ADAS target stand 800 are prepared for the calibration test. Note that the test setup for a calibration test is the same as when setting up the vehicle and the ADAS target stand 800 for a calibration procedure on one of the equipped ADAS sensors and/or vehicle sensors. An exemplary ADAS target stand 800 is configured for use in aligning ADAS targets 803 with vehicle and ADAS vehicle sensors for calibration and/or calibration testing. Referring to FIG. 2, a vehicle 103 in the vehicle service system 100 for one or more calibration and/or repair procedures would be positioned with respect to the ADAS target stand 800. If there were multiple calibration and/or calibration test procedures to perform, there could be different configurations for the ADAS target stand 800, which could include alternative or additional targets 803*a*, 803*b*, 803*c*. Each change in the ADAS target stand 800 and/or the targets 803*a*, 803*b*, 803*c* (and their setup) can be separately documented.

The ADAS target stand 800 can include a set of position sensors 820*a*, 820*b*, which could be used to determine a location of the ADAS target stand 800 with respect to the vehicle 103. The position sensors 820*a*, 820*b* can include a laser range finder, a time-of-flight range finder, and other range, position, and/or orientation sensors for determining an orientation and distance between the ADAS target stand 800 and the vehicle 103. Referring to FIG. 2, the position sensors 820*a*, 820*b* can be mounted to the vehicle 103 and/or the ADAS target stand 800 (e.g., pairs of sensors 820*a*, 820*b* could be used in combination). Based upon position information (e.g., distance and alignment measurements) from the position sensors 820*a*, 820*b*, either the vehicle 103 and/or the ADAS target stand 800 (or equipped targets 803) can be positioned into proper alignment for calibration of the ADAS vehicle sensor(s) using the interconnected equipped diagnostic tool 150 and ADAS target stand 800. Such alignments can be by moving the ADAS target stand 800 and/or the equipped targets 803 laterally, longitudinally, vertically, and/or rotationally about a vertical axis 812 relative to the vehicle 103 (i.e., and its vertical axis 813) and its equipped ADAS sensor(s). As also illustrated in FIG. 2, with the vehicle and ADAS target stand 800 positioned, a camera 804 could be positioned with respect to the vehicle and the ADAS target stand 800 and used to capture images of the vehicle 103 and the ADAS target stand 800. The image data from the camera can be used by the diagnostic tool 150 (or the computer device 111*a*, 111*b*) to determine an observed distance between the vehicle 103 and the ADAS target stand 800. The image data can also be used to determine whether the ADAS target stand 800 is properly oriented with respect to the vehicle 103 (the image data from the camera 804 is used to estimate an angle 812 of the ADAS target stand 800 with respect to an angle 813 of the vehicle 103). Thus, the ADAS target stand 800 can be positioned and oriented with respect to a vehicle 103 according to image data or through the use of position sensors 820*a*, 820*b* and allowing the ADAS target stand 800 to confirm its own position and orientation with respect to the vehicle 103. The ADAS target stand 800 is also configured to provide an indication of the targets (e.g., targets 803*a*, 803*b*, 803*c*) currently installed on the ADAS target stand 800.

With the vehicle 103 and associated test equipment (e.g., the ADAS target stand 800 and ADAS targets 803*a*, 803*b*, 803*c*) arranged with respect to each other, such that the vehicle 103 is positioned a prescribed distance from the ADAS target stand 800 (and its ADAS targets 803*a*, 803*b*, 803*c*), and with a prescribed alignment between them, the vehicle sensors are ready for calibration testing. As described herein, an exemplary calibration test program 702 is used to evaluate a sensor's existing calibration by comparing a vehicle determined location of a target 803 based on the vehicle sensor with the actual target 803 location, such as setup according to manufacture specifications, and determining whether the vehicle determined location of the target 803 is within a specified range of the actual position of the position 803.

Figure 5:
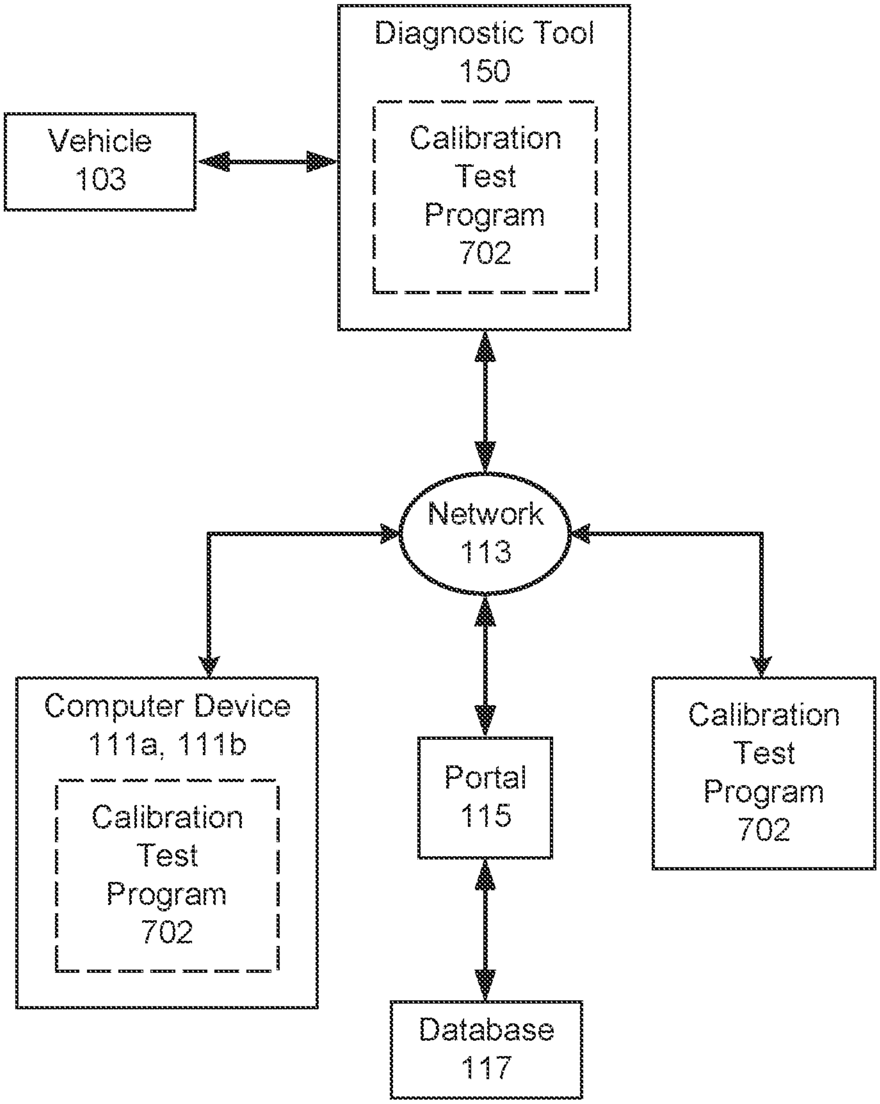
FIG. 5 is an exemplary schematic of the interactions of the vehicle service system of FIG. 1 and illustrating the operation of a calibration test program in accordance with the present invention.
Figure 6:
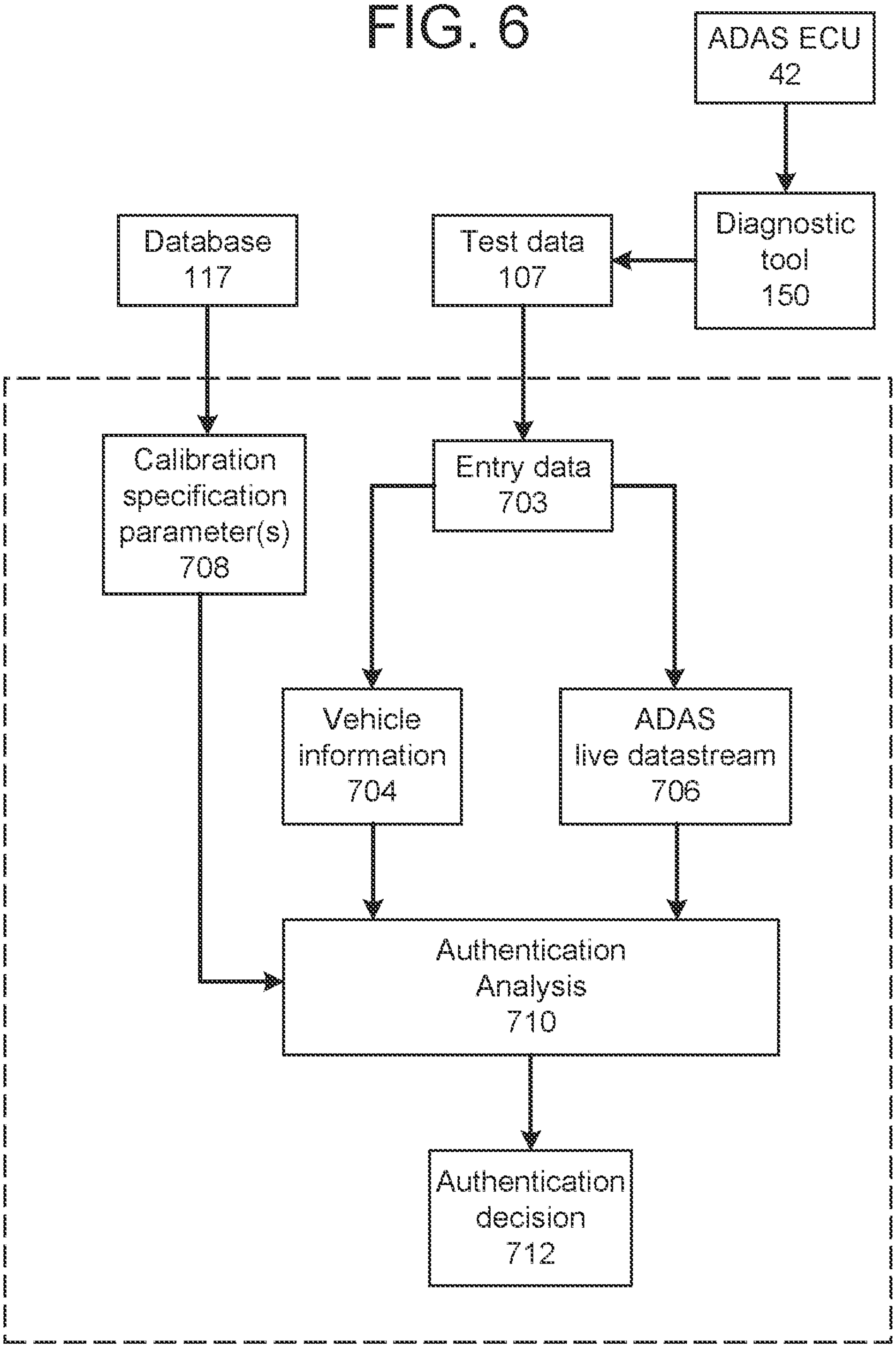
FIG. 6 is a schematic of an exemplary calibration test program for monitoring and evaluating calibration data produced during a calibration procedure performed on a vehicle in accordance with the present invention.

Referring to FIG. 5 an exemplary calibration test program 702 can be local to the diagnostic tool 150, the computer device 111*a*, 111*b*, or some other computer or computing arrangement. As illustrated in FIG. 6, the calibration test program 702 receives diagnostic data (e.g., test data 107) from the electronic system 219 of the vehicle 103 via the diagnostic tool 150 to monitor the live data stream from an ADAS sensor (e.g., via its ADAS ECU 42) as well as general diagnostic data from the vehicle 103. Thus, the calibration test program 702 receives entry data 703, such as the live or real-time data stream or data sets from an ADAS sensor, via for example, ADAS ECU 42, and vehicle information from the general diagnostic data (e.g., VIN, vehicle make, model, year, any diagnostic trouble codes (DTCs), list of equipped ADAS systems). From the entry data 703, the particular vehicle (make, model, and year) is identified (i.e., vehicle information 704) and the live data stream 706 from the ADAS sensor (i.e., via ADAS ECU 42) is selected. As discussed herein, the particular real-time or live data stream for the data stream 706 is monitored and extracted via an on-board diagnostic (OBD) diagnostic port 220 of the vehicle 103, and with the particular data stream or data set selected for monitoring according to its OBD parameter ID (PID). The vehicle information 704 is used to identify the particular calibration specifications for the ADAS system under calibration test (e.g., calibration parameters 708). As illustrated in FIG. 5, the calibration parameters 708 needed to evaluate the ADAS system under calibration test are retrieved from a local memory or a remote database (e.g., database 117 via portal 115 and network 113). As discussed herein, the calibration parameters 708 will identify the specified location of a target 803 as well as a range of valid values for an identified location for the target 803.

The vehicle information 704 and the live data stream 706, along with calibration parameters 708 for the ADAS system under test in the vehicle 103 are received by an authentication analysis module 710. The authentication analysis module 710 considers the real-time live data stream 706 for test values (e.g., determined range to a detected target 803*a*) and compares the test values to the specified parameters 708 for the selected ADAS system. The specified parameters 708 provide a range of acceptable range values for the target position. If the test values are within the specified range of the parameters 708, the ADAS system's calibration is determined by the authentication analysis module 710 to be an authenticate calibration and so reported in an authentication decision 712. However, if the test values from the calibration test are outside the specified range (as provided by the parameters 708), the ADAS system's calibration is determined by the authentication analysis module 710 to be incorrect or in error (i.e., unauthenticated or invalid) and so noted in the authentication decision 712.

Referring to FIG. 7, a method 500 for testing the validity of a calibration of a vehicle sensor or vehicle ADAS sensor on a vehicle 103 begins with step 502 of FIG. 7 where a vehicle 103 is prepared for the calibration test. As discussed herein, such preparations can include communicatively coupling a diagnostic tool 150 to an OBD interface portal 220 of the vehicle 103 such that the diagnostic tool 150 is able to monitor and extract diagnostic data from the electronic system 219 of the vehicle 103. The diagnostic data (e.g., test data 107) can include data streams from various sensors via their associated ECUs (e.g., ADAS ECU 42). In addition to monitoring the data stream or data sets coming from the sensors to be tested, the diagnostic tool 150 is also used to perform a diagnostic scan and to acquire vehicle information (e.g., vehicle make, model, year, VIN, and the like). The diagnostic scan can be used to determine whether there are any current DTCs for the sensors to be tested. The vehicle validation or set up can also include an evaluation of the diagnostic data for particular setup values, e.g., fuel level sensor signals, tire pressure sensor signals, and other sensor output signals related to the service to be performed. Such diagnostic data is monitored by the associated vehicle ECUs and captured by the diagnostic tool 150. As part of the setup procedure, the diagnostic tool 150 can also be configured to access the required calibration procedure and relevant OEM and/or aftermarket specifications and procedures for calibrating or calibration testing the sensors. Such setup procedures and associated documentation can be captured and used for service documentation and verification as disclosed in U.S. patent application Ser. No. 17/977,182, which is hereby incorporated herein by reference in its entirety.

In step 504 of FIG. 7, the vehicle 103 and the ADAS target stand 800 are positioned and aligned with respect to each other. As described herein, the positioning and orientation of the vehicle 103 with respect to the ADAS target stand 800 can be guided by the use of image data from a camera 804 positioned to view the positions and orientations of the vehicle 103 and the ADAS target stand 800. Alternatively, the positioning and orientation of the vehicle 103 with respect to the ADAS target stand 800 can be guided with the use of position sensors 820*a*, 820*b* (mounted on the ADAS target stand 800 and/or the vehicle 103) such that the ADAS target stand 800 can determine a distance and orientation between itself and the vehicle 103. As noted, the positional arrangement of the target 803 to the vehicle 103 and corresponding ADAS sensor 102, 102 may be done pursuant to OEM specifications for performing an ADAS calibration of the given ADAS sensor.

In step 506 of FIG. 7, the calibration test procedure is carried out. With the vehicle 103 and the ADAS target stand 800 positioned and aligned with respect to each other, an associated real time or live data stream or data sets output by the ADAS ECU 42 of the sensor under test can be monitored and captured. This data set or data stream includes calibration data that includes a determined location of a detected target 803 (e.g., the determined location of an ADAS target 803 positioned on the ADAS target stand 800).

In step 508 of FIG. 7, the captured data set or data stream from the ADAS ECU 42 of the sensor under test is reviewed with respect to predetermined specifications, such as OEM specification parameters. That is, the vehicle determined location of the target 803 is compared to the specified or actual location of the target 803. To be considered a valid or authentic calibration, the determined location of the detected target 803 must be within a specified range of the actual position of the target 803. If the determined location of the detected target 803 is not within a specified range of values for the actual position of the target 803, the sensor's calibration is considered to be invalid.

In step 510 of FIG. 7, the results of the calibration test and the associated vehicle and ADAS target stand setup are documented. As illustrated in FIG. 7, the documented results are produced in an authentication decision 712.

In step 512 of FIG. 7, the documented calibration test results and setup (e.g., the authentication decision report 712) are uploaded, e.g., to the portal 115, the computer devices 111*a*, 111*b*, or some other remote computer.

Thus, a previous calibration can be evaluated (i.e., tested) to authenticate or validate the calibration. Such calibration validations and authentications can be performed for calibrated vehicle sensors and ADAS sensors. Such calibration testing can be performed when there are reasons to question the validity of an existing calibration, e.g., after a vehicle collision, when there are DTCs associated with one or more ADAS sensors, or if the vehicle has been modified and there are reasons to question the calibration. By comparing the determined location of an ADAS target positioned before an ADAS sensor of the vehicle to its actual position, a sensor's calibration can be evaluated. As described herein, the vehicle and an ADAS target stand are positioned with respect to each other and the real-time or live data stream or data sets output by the sensor are monitored and evaluated to compare the determined location of the detected target with respect to the target's actual location. The target is positioned according to OEM and/or aftermarket specification parameters (i.e., factory or stock positions). The determined position of the target must be within a specified range of the actual position of the target to be considered correctly calibrated.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of evaluating the calibration of a vehicle advanced driver assist system (ADAS) sensor with a vehicle calibration test system comprising a vehicle diagnostic computer tool, the method comprising:

positioning the vehicle relative to an ADAS target stand for testing a calibration of an ADAS sensor on the vehicle, wherein the ADAS target stand is configured to support an ADAS target for use in evaluating a current calibration of the ADAS sensor, and wherein the vehicle and the ADAS target are positioned into a known orientation relative to each other according to an OEM specified orientation;

communicatively coupling a vehicle diagnostic computer tool to an electronic system of the vehicle;

receiving with the vehicle diagnostic computer tool vehicle data from the electronic system of the vehicle while the vehicle and ADAS target are in the OEM specified orientation relative to each other, wherein the vehicle data comprises sensor data output from the ADAS sensor while detecting the ADAS target in its OEM specified orientation; and determining with the vehicle diagnostic computer tool whether the current calibration of the ADAS sensor is correct and/or valid by evaluating the sensor data from the ADAS sensor with respect to an expected sensor data output from the ADAS sensor while the vehicle and the ADAS target are in their OEM specified orientation with respect to each other.

2. The method of claim 1, wherein the sensor data from the ADAS sensor represents a vehicle determined position of the ADAS target relative to the ADAS sensor.

3. The method of claim 2, wherein said evaluating the sensor data from the ADAS sensor with respect to the expected sensor data output from the ADAS sensor comprises comparing the sensor data from the ADAS sensor to an expected data range.

4. The method of claim 2, wherein said evaluating the sensor data from the ADAS sensor with respect to the expected sensor data output from the ADAS sensor comprises comparing the sensor data from the ADAS sensor to an expected determined position of the ADAS target.

5. The method of claim 2, wherein said evaluating the sensor data from the ADAS sensor with respect to the expected sensor data output from the ADAS sensor comprises comparing the vehicle determined position of the ADAS target with the known orientation of the ADAS target.

6. The method of claim 1, wherein said positioning the vehicle relative to an ADAS target stand for testing a calibration of an ADAS sensor on the vehicle comprises positioning the ADAS target and the vehicle into respective vehicle manufacturer specified positions for calibrating the ADAS sensor.

7. The method of claim 1, wherein said receiving with the vehicle diagnostic computer tool vehicle data from the electronic system of the vehicle comprises receiving sensor data from the ADAS sensor while the vehicle electronic system is operating in a calibration or diagnostic mode.

8. The method of claim 1, wherein the sensor data from the ADAS sensor comprises a real-time data stream or data set associated with the ADAS sensor.

9. The method of claim 8, and wherein the real-time data stream or data set comprises data associated with the vehicle determined location of the detected ADAS target.

10. A method of evaluating the calibration of a vehicle advanced driver assist system (ADAS) sensor with a vehicle calibration test system comprising a vehicle diagnostic computer tool, the method comprising:

positioning the vehicle relative to an ADAS target stand for testing a calibration of an ADAS sensor on the vehicle, wherein the ADAS target stand is configured to support an ADAS target for use in evaluating a current calibration of the ADAS sensor, and wherein the vehicle and the ADAS target are positioned into a known orientation relative to each other according to an OEM specified orientation;

communicatively coupling a vehicle diagnostic computer tool to an electronic system of the vehicle;

receiving with the vehicle diagnostic computer tool vehicle data from the electronic system of the vehicle while the vehicle and ADAS target are in the OEM specified orientation relative to each other, wherein the vehicle data comprises sensor data output from the ADAS sensor while detecting the ADAS target in its OEM specified orientation; and determining with the vehicle diagnostic computer tool whether the current calibration of the ADAS sensor is correct and/or valid by evaluating the sensor data from the ADAS sensor with respect to an expected sensor data output from the ADAS sensor while the vehicle and the ADAS target are in their OEM specified orientation with respect to each other, and wherein the sensor data from the ADAS sensor represents a vehicle determined position of the ADAS target relative to the ADAS sensor.

11. The method of claim 10, wherein said positioning the vehicle relative to an ADAS target stand for testing a calibration of an ADAS sensor on the vehicle comprises positioning the ADAS target and the vehicle into respective vehicle manufacturer specified positions for calibrating the ADAS sensor.

12. The method of claim 10, wherein said evaluating the sensor data from the ADAS sensor with respect to the expected sensor data output from the ADAS sensor comprises comparing the sensor data from the ADAS sensor to an expected determined position of the ADAS target.

13. The method of claim 10, wherein said evaluating the sensor data from the ADAS sensor with respect to the expected sensor data output from the ADAS sensor comprises comparing the vehicle determined position of the ADAS target with the known orientation of the ADAS target.

14. The method of claim 10, wherein the sensor data from the ADAS sensor comprises a real-time data stream or data set associated with the ADAS sensor, and wherein the real-time data stream or data set comprises data associated with the vehicle determined location of the detected ADAS target.

15. A vehicle calibration test system for evaluating the calibration of a vehicle advanced driver assist system (ADAS) sensor comprising:

an ADAS target stand configured to support an ADAS target, wherein the ADAS target stand is configured to support the ADAS target in a known orientation relative to an ADAS sensor of a vehicle according to an OEM specified orientation for evaluating a current calibration of the ADAS sensor;

a vehicle diagnostic computer tool configured to be communicatively coupled to an electronic system of the vehicle, and wherein the vehicle diagnostic computer tool is configured to receive vehicle data from the electronic system of the vehicle;

wherein the vehicle data comprises sensor data output from the ADAS sensor while detecting the ADAS target in its OEM specified orientation, and wherein said vehicle diagnostic tool is configured to evaluate the sensor data from the ADAS sensor to determine whether the current calibration of the ADAS sensor is correct and/or valid by evaluating the sensor data from the ADAS sensor with respect to an expected sensor data output from the ADAS sensor while the vehicle and the ADAS target are in their OEM specified orientation with respect to each other.

16. The vehicle calibration system of claim 15, wherein the sensor data from the ADAS sensor with respect to the expected sensor data output from the ADAS sensor represents a vehicle determined position of the ADAS target relative to the ADAS sensor.

17. The vehicle calibration system of claim 16, wherein said vehicle diagnostic tool is configured to evaluate the sensor data from the ADAS sensor with respect to the expected sensor data output from the ADAS sensor by comparing the vehicle determined position of the ADAS target with the known orientation of the ADAS target.

18. The vehicle calibration system of claim 15, wherein said vehicle diagnostic tool is configured to evaluate the sensor data from the ADAS sensor with respect to the expected sensor data output from the ADAS sensor by comparing the sensor data from the ADAS sensor to an expected data range.

19. The vehicle calibration system of claim 15, wherein said vehicle diagnostic tool is configured to evaluate the sensor data from the ADAS sensor with respect to the expected sensor data output from the ADAS sensor by comparing the sensor data from the ADAS sensor to an expected determined position of the ADAS target.

* * * * *